(12) United States Patent
Rochat et al.

(10) Patent No.: US 11,150,607 B2
(45) Date of Patent: Oct. 19, 2021

(54) MAGNETIC DEVICE FOR CENTRING A SHAFT IN A CLOCKWORK MOVEMENT

(71) Applicant: Montres Breguet S.A., L'Abbaye (CH)

(72) Inventors: Jean-Philippe Rochat, Les Bioux (CH); Benoit Legeret, Ecublens (CH)

(73) Assignee: Montres Breguet S.A., L'Abbaye (CH)

( * ) Notice: Subject to any disclaimer, the term of this patent is extended or adjusted under 35 U.S.C. 154(b) by 522 days.

(21) Appl. No.: 16/195,888

(22) Filed: Nov. 20, 2018

(65) Prior Publication Data
US 2019/0163141 A1 May 30, 2019

(30) Foreign Application Priority Data

Nov. 27, 2017 (EP) .................................... 17203695

(51) Int. Cl.
| | | |
|---|---|---|
| *G04B 31/00* | (2006.01) | |
| *G04C 5/00* | (2006.01) | |
| *F16C 32/04* | (2006.01) | |
| *G04B 31/004* | (2006.01) | |

(52) U.S. Cl.
CPC ............ *G04C 5/005* (2013.01); *F16C 32/041* (2013.01); *G04B 31/00* (2013.01); *G04B 31/004* (2013.01); *F16C 2370/00* (2013.01)

(58) Field of Classification Search
CPC .... F16C 32/041; F16C 2370/00; G04C 5/005; G04B 31/00; G04B 31/004
See application file for complete search history.

(56) References Cited

U.S. PATENT DOCUMENTS

| 5,506,459 A * | 4/1996 | Ritts ....................... F16C 17/08 |
| | | 310/90.5 |
| 9,030,070 B2 * | 5/2015 | Marechal .............. F16C 25/045 |
| | | 310/90.5 |
| 9,690,256 B2 * | 6/2017 | Zaugg ................. F16C 32/0412 |

(Continued)

FOREIGN PATENT DOCUMENTS

| EP | 2 887 153 A1 | 6/2015 |
| EP | 3 106 934 A1 | 12/2016 |

OTHER PUBLICATIONS

European Search Report dated May 24, 2018 in European Application 17203695.6 filed on Nov. 27, 2017 (with English Translation of Categories of Cited Documents).

(Continued)

Primary Examiner — Sean Kayes
(74) Attorney, Agent, or Firm — Oblon, McClelland, Maier & Neustadt, L.L.P.

(57) ABSTRACT

A magnetic device for centring a shaft on a predetermined axis in a clockwork movement includes at least one first magnetic bearing provided with a magnet to exert an attractive force on a first ferromagnetic end pivot of the shaft. The first magnetic bearing includes a central part made of soft ferromagnetic material mounted between the magnet and the first end pivot of the shaft. The central part is positioned centrally in a washer made of non-magnetic material so as to centre the magnetic field flux generated by the permanent magnet through the central part in order to magnetically attract the first end pivot of the shaft on the predetermined axis. The diameter of the central part can be identical to, or 0 to 20% less than, or 0 to 20% greater than, the diameter of the first end pivot.

16 Claims, 3 Drawing Sheets

(56) References Cited

U.S. PATENT DOCUMENTS

| | | | | |
|---|---|---|---|---|
| 9,727,026 B2* | 8/2017 | Tadla | ................... | G04B 31/004 |
| 9,778,619 B2* | 10/2017 | Zaugg | ................... | G04B 5/184 |
| 10,474,107 B2* | 11/2019 | Rochat | ................... | G04B 31/02 |
| 2012/0112589 A1* | 5/2012 | Marechal | .............. | F16C 25/045 |
| | | | | 310/90.5 |
| 2015/0177695 A1 | 6/2015 | Tadla et al. | | |
| 2016/0370762 A1 | 12/2016 | Zaugg et al. | | |

OTHER PUBLICATIONS

Chinese Office Action dated Dec. 8, 2020 in Chinese Patent Application No. 201811426251.0, 4 pages.

\* cited by examiner

MAGNETIC DEVICE FOR CENTRING A SHAFT IN A CLOCKWORK MOVEMENT

CROSS-REFERENCE TO RELATED APPLICATION

This application claims priority to European Patent Application No. 17203695.6 filed on Nov. 27, 2017, the entire disclosure of which is hereby incorporated herein by reference.

FIELD OF THE INVENTION

The present invention relates to a magnetic device for centring a shaft on a predetermined axis in a clockwork movement, the device comprising at least one magnetic bearing provided with a magnet arranged so as to exert an attractive force on a pivot, made of magnetic material, of the shaft.

PRIOR ART

It is known that permanent magnets can be used in rotary members of clockwork movements, for example to hold the shaft of a rotating part on a predetermined axis. This has the advantage of generating substantial, normally highly localised holding forces while limiting friction from the rotating shaft. However, the magnetic field can be off-centre by an excessive amount if there is no magnetic centring means, which leads to a large number of parts being produced but rejected after manufacture.

Patent application WO 2012/062524 A1 may be cited. This describes, in relation to FIG. 13 of the document, a pivot device for a shaft with at least one magnetic bearing, illustrated as prior art in FIG. 1. This FIG. 1 illustrates a pivot device comprising a shaft 1, the ends of which form two pivots with reference numerals 2 and 3 respectively. The pivots are made of a magnetic material. FIG. 1 also shows a first bearing and a second bearing arranged so as to support and guide the two pivots 2 and 3 in rotation. Each of the two bearings includes a setting, with respective reference numerals 40 and 44, a permanent magnet, with respective reference numerals 4 and 6, mounted in the setting, and a jewel with a support surface, with respective reference numerals 18A and 19A, inserted between the magnet and the mouth of the setting. The magnets 4 and 6 of the first bearing and the second bearing are oriented so as to attract respectively the first pivot and the second pivot, such that the shaft 1 is held in the pivot axis, with a certain amount of radial and axial play.

Producing reliable clockwork mechanisms that operate on the above-mentioned principles represents a major technical challenge, since the dimensions are extremely small. Moreover, great spatial precision is required in order for chronometric functions to be performed precisely.

Patent application EP 3 106 934 A1 may also be cited. This describes a pivot device for a shaft on a predetermined axis provided with at least one magnetic bearing with a magnet and a structure for centring the magnetic flux towards the pivot of the shaft. This centring structure comprises a peripheral portion and a central portion resiliently connected to the peripheral portion by a linking component. The central portion is formed of a material with high magnetic permeability and smaller dimensions than those of the magnet.

In general, in a known magnetic centring device such as that described in patent applications EP 3 106 934 A1 or CH 711 220 A2, the various components of the device are checked on assembly and if the magnetic field generated by at least one magnet of the magnetic bearing is off-centre by too great a value, the parts produced are rejected. Currently, with a known magnetic centring device, the rejection rate is too great, and it is difficult to industrialise such a device, which constitute drawbacks.

SUMMARY OF THE INVENTION

An aim of the present invention is to remedy the drawbacks of the prior art by providing a magnetic device for centring a shaft on a predetermined axis in a clockwork movement, wherein the magnetic field lines generated by at least one magnet are properly centred in the direction of the axis of rotation of the shaft, with simplified construction.

Thus, the invention relates to a magnetic device for centring a shaft on a predetermined axis in a clockwork movement, the device comprising at least one first magnetic bearing including a first magnet, which is intended to exert an attractive force on a first end pivot, made of ferromagnetic material, of the shaft, wherein the first magnetic bearing comprises at least one first central part made of ferromagnetic material mounted between the first magnet and the first end pivot of the shaft, this first central part being positioned centrally in a first washer or bush made of non-magnetic material in such a way as to centre the magnetic field flux generated by the first magnet through the first central part in order to magnetically attract the first end pivot of the shaft on the predetermined axis, wherein the first magnetic bearing also comprises a first balance-pivot endstone, which is mounted between the first central part and the first end pivot of the shaft, and wherein the first central part is glued or driven into a central opening in the first washer or bush, and in that the first washer or bush, together with the first central part, are in direct contact with the first magnet and the first balance-pivot endstone.

The particular embodiments of the magnetic centring device are defined in dependent claims 2 to 14.

One advantage of the magnetic centring device lies in the fact that, with the centring pad for the magnetic field generated by the magnet, one of the end pivots of the shaft can be properly centred on a predetermined axis. Intensity of the magnetic field is increased in the central portion, which is constituted by the pad, preferably made of soft ferromagnetic material, while the radial gradient of the magnetic field is also increased. The magnetic restoring force, which acts radially on the end pivot of the shaft, is thus increased in order to ensure correct centring of the shaft.

Another advantage of the magnetic centring device for the shaft lies in the fact that good centring of the magnetic field is easily achieved by means of the centring pad. Moreover, the simplified structure of the magnetic bearing comprising the pad is easy to produce. The magnetic field is recentred by a factor of 2 to 3. Under these conditions, the number of parts rejected after manufacture of the magnetic centring device is greatly reduced in comparison with the devices of the prior art.

BRIEF DESCRIPTION OF THE FIGURES

The aims, advantages and features of the magnetic device for centring a shaft on a predetermined axis in a clockwork movement will become more clearly apparent in the following description, particularly with regard to the drawings in which.

DETAILED DESCRIPTION OF THE INVENTION

In the following description, all the portions of a magnetic device for centring a shaft on a predetermined axis in a clockwork movement, which are well known in this technical field, will be described only briefly.

Figure 1:
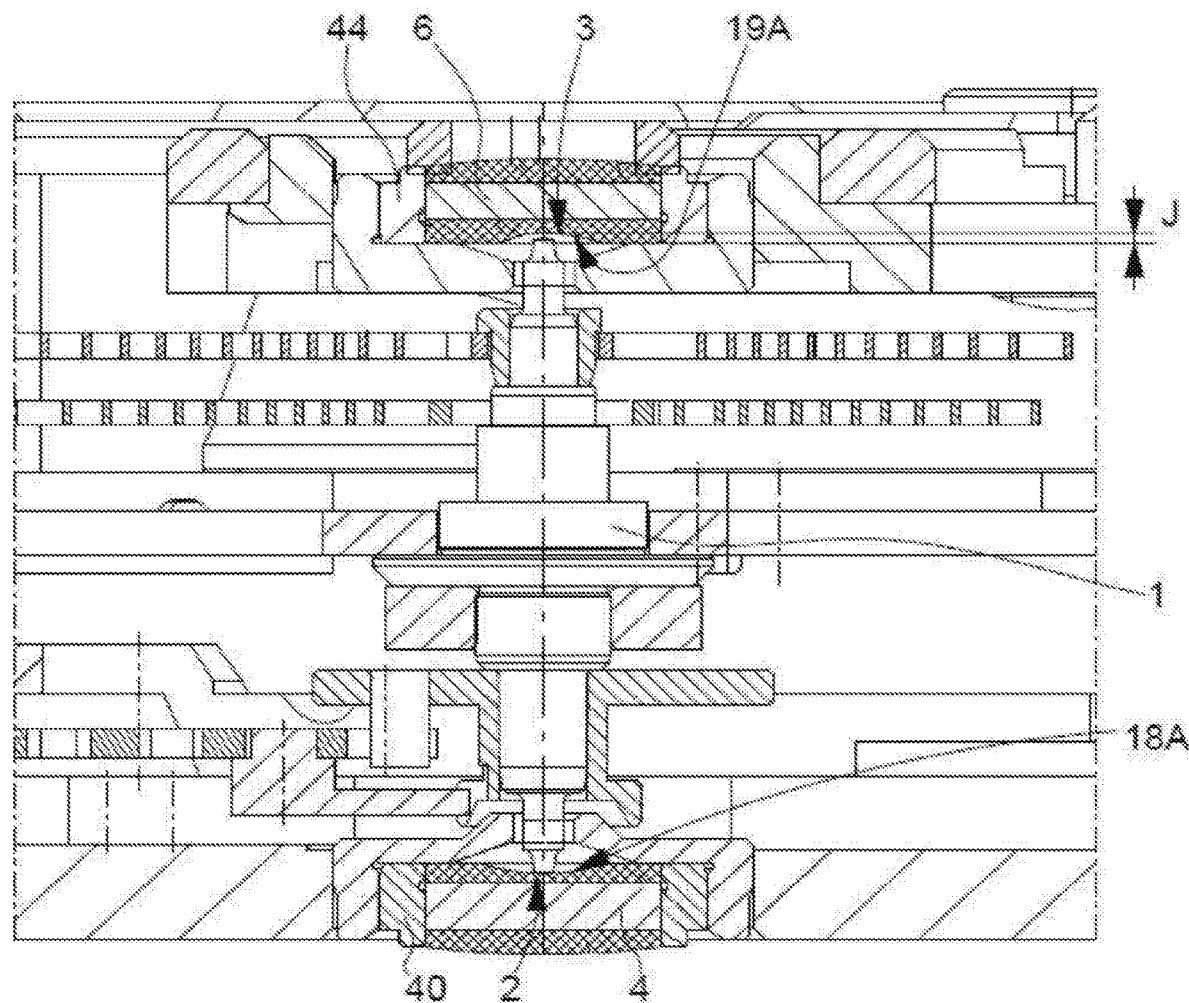
FIG. 1 is a longitudinal sectional view of a magnetic pivot device of the prior art.
Figure 2:
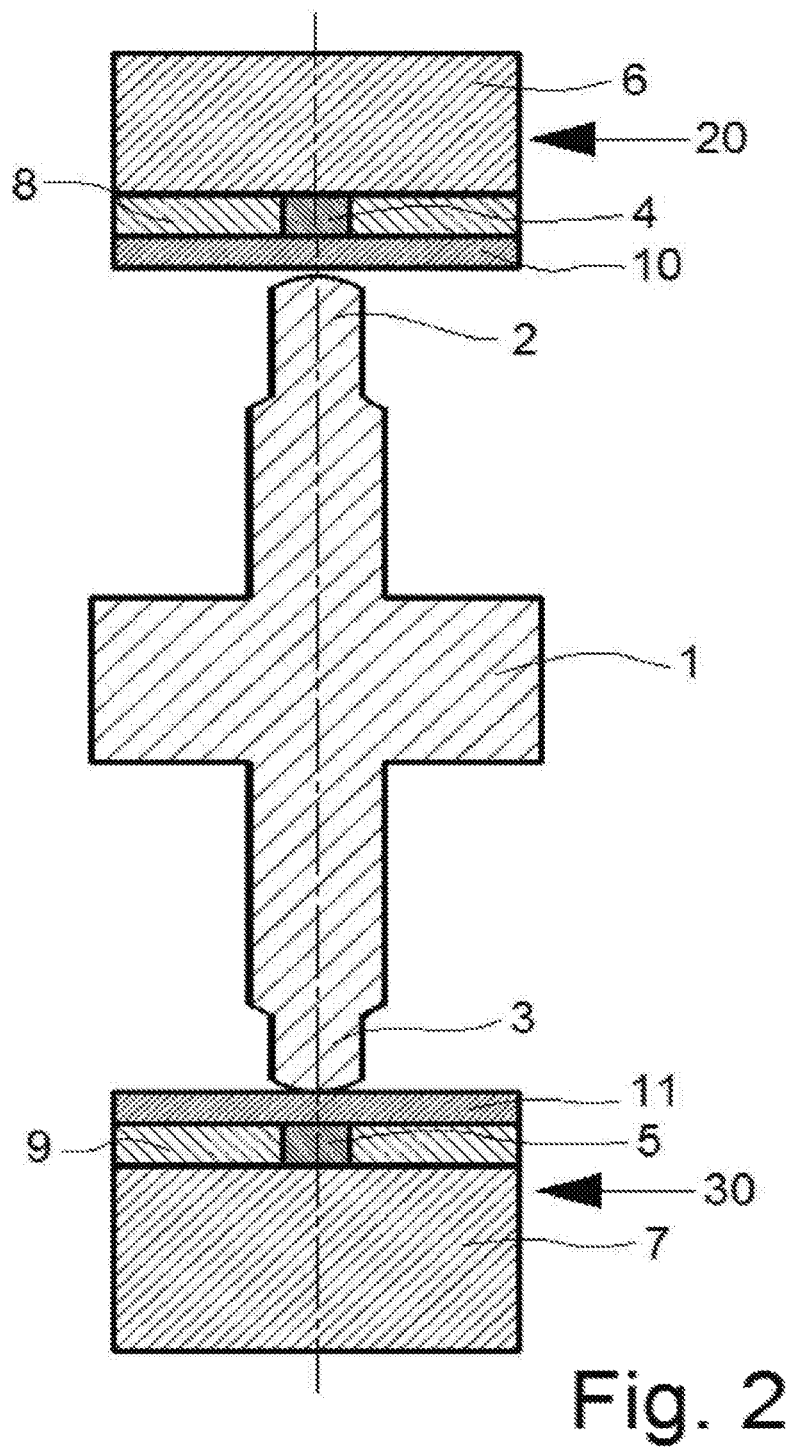
FIG. 2 is a view of the principle of magnetic centring of a shaft on a predetermined axis of a clockwork movement with the magnetic centring device according to the invention.

FIG. 2 is a simplified illustration of a magnetic device for centring a shaft 1 on a predetermined axis in a clockwork movement. The magnetic centring device comprises at least one magnetic bearing 20 to centre a shaft 1 on a predetermined axis. To do this, the shaft 1 comprises at least one end pivot 2 made of ferromagnetic material. As illustrated in FIG. 2, the magnetic centring device preferably comprises two magnetic bearings 20, 30 positioned on either side of two end pivots 2 and 3 of a shaft 1 intended to rotate when the clockwork movement is in operation. The two magnetic bearings 20, 30 have the function of using magnetic attraction to hold the shaft 1 on a predetermined axis, for rotation thereof.

In this FIG. 2, the first magnetic bearing 20 comprises, in sequence from the first end pivot 2 of the shaft 1, at least one first balance-pivot endstone 10, which can be made of ruby, a first central part 4, which can be a first pad 4 made of soft ferromagnetic material, positioned so as to be centred over the first endstone. The first pad 4 is, for example, positioned centred on the endstone 10. The first pad 4 is inserted or driven or glued into a central opening in a first washer 8 or bush made of non-magnetic material, such as brass. Directly above the assembly, which comprises the first washer 8 and the first pad 4 for centring the magnetic field, at least one first magnet 6 is positioned, which can have the same diameter as the first washer 8. This permanent magnet can be made of neodymium-iron-boron, for example. The magnetic field flux generated by the first magnet 6 is recentred so as to pass through the first pad 4 in order to increase the radial attractive force of the first ferromagnetic pivot 2, to centre the shaft 1 on a predetermined axis. This predetermined axis is normally the axis of rotation of the shaft 1 when the clockwork movement is in operation.

In FIG. 2, the magnetic centring device also preferably comprises a second magnetic bearing 30 positioned facing a second end pivot 3 of the shaft 1 opposite the first end pivot 2. The second magnetic bearing 30 comprises, in sequence from the second end pivot 3, at least one second balance-pivot endstone 11, which can be made of ruby, a second central part 5, which can be a second pad 5 made of soft ferromagnetic material, on the second endstone. The second pad 5 is, for example, positioned centred on the second endstone 11. The second pad 5 is inserted or driven or glued in a central position in a second washer 9 or bush made of non-magnetic material, such as brass. Directly above the assembly, which comprises the second washer 9 and the second pad 5 for centring the magnetic field, at least one second magnet 7 is positioned, which can have the same diameter as the second washer 9. The magnetic field flux generated by the second magnet 7 is recentred so as to pass through the second pad 5 in order to increase the radial attractive force of the second ferromagnetic pivot 3, to centre the shaft 1 on a predetermined axis.

The space between the first endstone 10 and the first end pivot 2 or between the second endstone 11 and the second end pivot 3 is less than 0.1 mm and preferably less than 0.03 mm. This depends on the dimension of the shaft 1 and the two end pivots 2, 3, which can have a diameter of less than 1 mm and preferably of the order of 0.15 mm. Thus, the first and second permanent magnets 6, 7 provide sufficient magnetic attractive force through each pad 4, 5 for each pivot 2, 3. The thickness of each balance-pivot endstone 10, 11 is less than 1 mm and preferably of the order of 0.06 mm. Each central part or pad 4, 5 made of soft ferromagnetic material can have an outside diameter identical to the diameter of each end pivot 2, 3 or a 0 to 20% smaller diameter, for example.

However, it is also conceivable that each central part or pad 4, 5 made of soft ferromagnetic material can have an outside diameter identical to the diameter of each end pivot 2, 3 or a 0 to 20% larger diameter, for example.

With each magnetic bearing 20, 30 being arranged in such a way, the mounting of each part is facilitated, allowing the magnetic flux of each magnet to be better recentred so as to hold the two end pivots 2, 3 of the shaft 1 on a predetermined axis. The magnetic flux generated by the magnets 6, 7 is recentred by a factor of 2 to 3.

It should also be noted that each central part or pad 4, 5, as well as the shaft 1, can be formed of a material with high magnetic permeability, such as a soft ferromagnetic material. The soft ferromagnetic material can be chosen from iron, cobalt, nickel, magnesium, silicon, iron-cobalt alloy, nickel-cobalt alloy or iron-nickel alloy. In one embodiment, the material can be nickel-phosphorus with a percentage of phosphorus of less than or equal to 11%. According to another variant the magnetic flux centring component can be made entirely of a soft magnetic material, characterised by a coercive field $H_c$ of less than 5 kA/m, saturation greater than 0.5 T and a maximum permeability $\mu_R$ equal to or greater than 1000. According to another variant, the material could also be a hard magnetic material.

Figure 3:
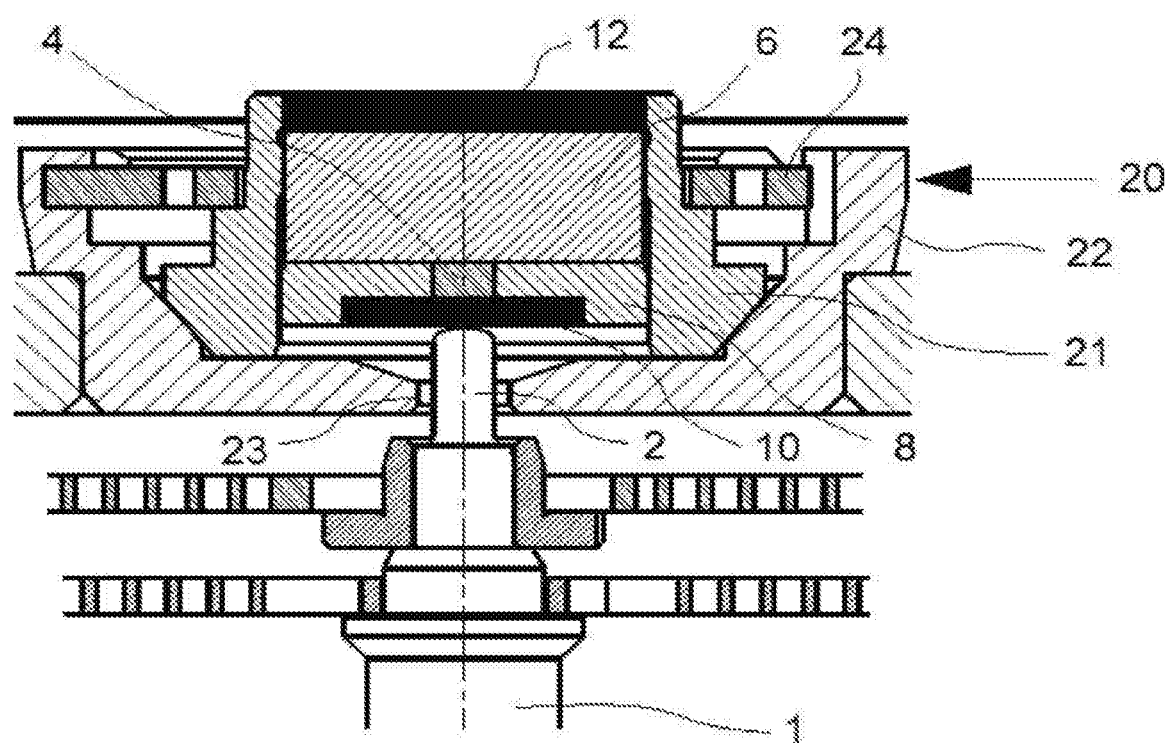
FIG. 3 is a partial sectional view of a portion of the clockwork movement with the magnetic centring device according to the invention.

FIG. 3 illustrates a section through a portion of the clockwork movement with the magnetic centring device according to the invention.

This FIG. 3 shows principally the first, more complete magnetic bearing 20, and the first end pivot 2 of the shaft 1, which is held magnetically on a predetermined axis by the first magnetic bearing 20.

The first magnetic bearing 20 comprises a first support 22, which includes a base on the side of the first end pivot 2 with an opening 23 having a diameter greater than the diameter of the first end pivot 2. The first magnetic bearing 20 is arranged so as to support and guide in rotation the first end pivot 2. The first end pivot 2 passes through the opening 23 in the first support 22 with no direct contact. The first support 22 is also designed for positioning a first setting 21. For this purpose, the first setting 21 is held in an inverted cone-shaped seat in the first support 22, by resilient means 24 positioned in the upper inner portion of the first support 22. The first support 22 is a revolving part comprising a circular rim.

The first magnetic bearing 20 also comprises, in the first setting 21, in sequence from the top, a first upper endstone 12, a first permanent magnet 6, a first central part or pad 4 for centring the magnetic field flux generated by the first magnet 6, said first pad 4 being driven into a first non-magnetic washer or bush 8, and a first balance-pivot endstone 10. The first end pivot 2 is properly centred and attracted by the attractive force of the magnetic field flux passing through the first pad 4 made of soft ferromagnetic material.

The first upper endstone 12 is arranged so as to close off the top of the setting 21 and to serve as a support for the first magnet 6, which has an outside diameter identical to the outside diameter of the first upper endstone 12. The first washer 8 also has an outside diameter identical to the outside diameter of the first permanent magnet 6. The first balance-pivot endstone 10 has a diameter less than that of the first washer 8 while being fixed within a lower central hollow in the first washer 8 on the side of the first end pivot 2. This first balance-pivot endstone 10 has a support surface for the first end pivot 2.

It should also be noted that, in the event of axial impact, the first end pivot 2 can push the first balance-pivot endstone 10, and the first setting 21 comprising it, back upwards. The resilient means 24 allow the first setting 21 to be returned to its initial position. In the event of radial displacement following an impact suffered by the first end pivot 2, the opening 23 in the first support allows its displacement to be limited.

Only a first magnetic bearing 20 has been described with reference to FIG. 3. However, a second magnetic bearing 30 can be provided on the side of a second end pivot 3 opposite the first end pivot 2. This second magnetic bearing comprises the same components (not shown) as the first magnetic bearing.

The second magnetic bearing comprises a second support with an opening for the second end pivot, a second setting held by the resilient means in the second support. The second setting also comprises, in sequence from the bottom, a second lower endstone, a second permanent magnet, a second central part or pad for centring the magnetic field flux generated by the second magnet, said second pad being driven into a second non-magnetic washer or bush, and a second balance-pivot endstone for the second end pivot.

With the arrangement of the first magnetic bearing and the second magnetic bearing, the first and second end pivots of the shaft are held in equilibrium centrally by the maximum magnetic attractive force of the magnetic flux of the magnets passing through the ferromagnetic pads.

It should also be noted that each support surface of the first and second balance-pivot endstones 10, 11 can have a recess shaped like a spherical cap to prevent excessive radial displacement of the first and second end pivots of the shaft.

Based on the above description, several variant embodiments of the magnetic device for centring a shaft on a predetermined axis in a clockwork movement can be imagined by a person skilled in the art without leaving the scope of the invention as defined by the claims.

The invention claimed is:

1. A magnetic device for centring a shaft on a predetermined axis in a clockwork movement, the device comprising at least one first magnetic bearing including a first magnet, which is intended to exert an attractive force on a first end pivot, made of ferromagnetic material, of the shaft, wherein the first magnetic bearing comprises at least one first central part made of ferromagnetic material mounted between the first magnet and the first end pivot of the shaft, this first central part being positioned centrally in a first washer or bush made of non-magnetic material in such a way as to centre the magnetic field flux generated by the first magnet through the first central part in order to magnetically attract the first end pivot of the shaft on the predetermined axis, wherein the first magnetic bearing also comprises a first balance-pivot endstone, which is mounted between the first central part and the first end pivot of the shaft, and wherein the first central part is glued or driven into a central opening in the first washer or bush, and wherein the first washer or bush, together with the first central part, are in direct contact with the first magnet and the first balance-pivot endstone.

2. The magnetic centring device according to claim 1, wherein the diameter of the first central part is identical to, or 0 to 20% greater than, the diameter of the first end pivot.

3. The magnetic centring device according to claim 1, wherein the diameter of the first central part is identical to, or 0 to 20% less than, the diameter of the first end pivot.

4. The magnetic centring device according to claim 1, wherein the first balance-pivot endstone is made of ruby.

5. The magnetic centring device according to claim 1, wherein the first central part is made of a soft ferromagnetic material.

6. The magnetic centring device according to claim 1, wherein the first washer or bush is made of brass.

7. The magnetic centring device according to claim 1, wherein the outside diameter of the first magnet is identical to the outside diameter of the washer or bush and to the outside diameter of the first balance-pivot endstone.

8. The magnetic centring device according to claim 7, wherein the first magnetic bearing comprises a first support, which includes a base on the side of the first end pivot with an opening having a diameter greater than the diameter of the first end pivot for the contactless passage of the first end pivot, a first setting positioned in the first support and held in an inverted cone-shaped seat in the first support by resilient means, and in that wherein the setting comprises, in sequence, a first upper endstone, the first permanent magnet, the first central part positioned in the first washer or bush, and the first balance-pivot endstone.

9. The magnetic centring device according to claim 1, wherein the outside diameter of the first magnet is identical to the outside diameter of the washer or bush, and wherein the first balance-pivot endstone has a diameter that is less than the diameter of the first washer or bush while being fixed within a lower central hollow in the first washer or bush on the side of the first end pivot.

10. The magnetic centring device according to claim 1, comprising a second magnetic bearing comprising a second magnet, which is intended to exert an attractive force on a second end pivot, made of ferromagnetic material, of the shaft, the second end pivot being opposite the first end pivot of the shaft.

11. The magnetic centring device according to claim 10, wherein the second magnetic bearing comprises a second central part made of soft ferromagnetic material mounted between the second magnet and the second end pivot of the shaft, this second central part being positioned centrally in a second washer or bush made of non-magnetic material so as to centre the magnetic field flux generated by the second magnet through the second central part in order to magnetically attract the second end pivot of the shaft on the predetermined axis, wherein the diameter of the second central part is identical to, or 0 to 20% greater than, the diameter of the second end pivot, and wherein the second magnetic bearing also comprises a second balance-pivot endstone, which is mounted between the second central part and the second end pivot of the shaft.

12. The magnetic centring device according to claim 11, wherein the second balance-pivot endstone is made of ruby.

13. The magnetic centring device according to claim 11, wherein the second washer or bush is made of brass.

14. The magnetic centring device according to claim 10, wherein the second magnetic bearing comprises a second central part made of soft ferromagnetic material mounted between the second magnet and the second end pivot of the shaft, this second central part being positioned centrally in a second washer or bush made of non-magnetic material so as to centre the magnetic field flux generated by the second magnet through the second central part in order to magnetically attract the second end pivot of the shaft on the predetermined axis, wherein the diameter of the second central part is identical to, or 0 to 20% less than, the diameter of the second end pivot, and wherein the second magnetic bearing also comprises a second balance-pivot endstone, which is mounted between the second central part and the second end pivot of the shaft.

15. The magnetic centring device according to claim 14, wherein the second balance-pivot endstone is made of ruby.

16. The magnetic centring device according to claim 14, wherein the second washer or bush is made of brass.

* * * * *